United States Patent [19]
Hubbard, Jr.

[11] 3,726,370
[45] Apr. 10, 1973

[54] BIDIRECTIONAL NO-BACK COUPLING

[76] Inventor: Lex W. Hubbard, Jr., 4637 Park Murasol, Calabasas Park, Calif. 91302

[22] Filed: July 15, 1971

[21] Appl. No.: 163,010

[52] U.S. Cl. ...................................192/8 C, 64/14
[51] Int. Cl. ........................F16d 67/00, F16d 49/02
[58] Field of Search .......................................192/8 C

[56] References Cited
UNITED STATES PATENTS

| | | | |
|---|---|---|---|
| 1,997,646 | 4/1935 | Miller | 192/8 C |
| 307,663 | 11/1884 | Lane | 192/8 C |
| 2,458,441 | 1/1949 | Starkey | 192/8 C |
| 2,946,417 | 7/1960 | Hungerford | 192/8 C |

*Primary Examiner*—Benjamin W. Wyche
*Attorney*—Fulwider, Patton, Rieber, Lee & Utecht

[57] ABSTRACT

A coupling in which an input shaft is disposed in end-to-end relation with an output shaft, and two fixed sleeves are disposed around the adjacent end portions of the shafts with helical locking springs wrapped around the sleeves to grip the latter. The adjacent ends of the springs are secured to the output shaft so that one spring is tightened around its sleeve when torque is applied to the output shaft in either direction, and a cylindrical cage rotatable with the input shaft has dogs engaging the remote ends of the springs to loosen the spring that otherwise would be tightened, thereby freeing the output shaft for rotation by the input shaft through a jaw-type connection. A preloaded spring shifts the cage to the neutral position upon cessation of turning of the input shaft, thereby immediately relocking the output shaft.

17 Claims, 3 Drawing Figures

PATENTED APR 10 1973 3,726,370
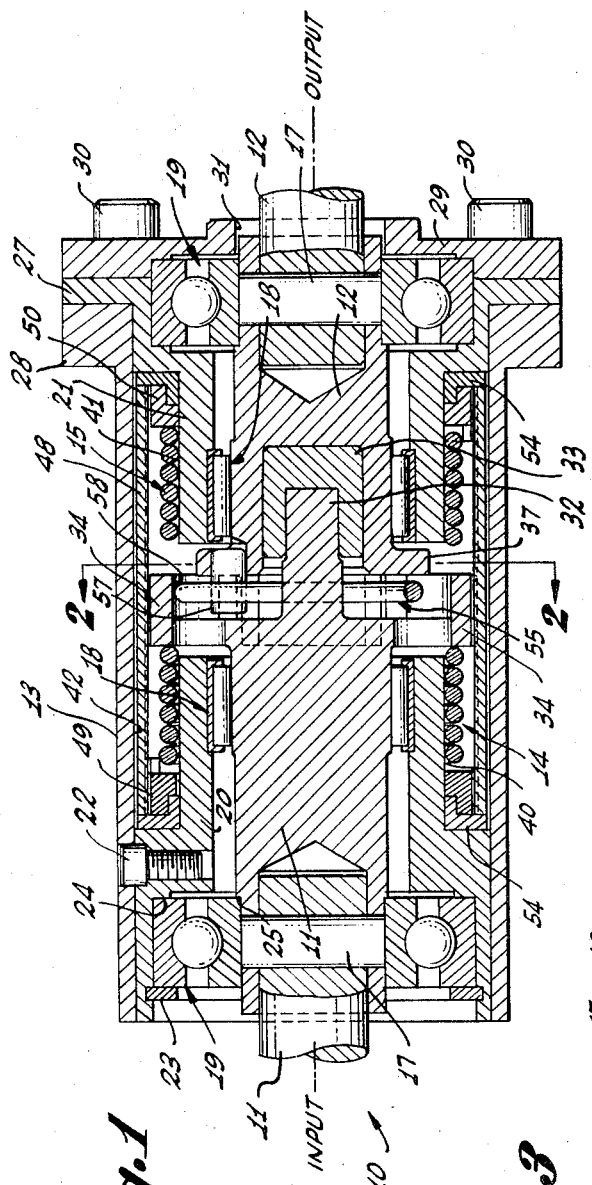
INVENTOR.
LEX W. HUBBARD JR.
BY Fulwider, Patton, Rieber
Lee, and Utecht
ATTORNEYS

BIDIRECTIONAL NO-BACK COUPLING

BACKGROUND OF THE INVENTION

This invention relates to the coupling of two shafts together to transmit driving torque from one shaft to the other, and relates more particularly to couplings of the type known as bidirectional no-back couplings in which the driven or output shaft is rotatable selectively in either direction by the driving or input shaft, and is locked against the transmission of torque in either direction back to the input shaft.

Couplings of this general type have been known in the past, and typically comprise a housing adapted to be mounted in a fixed position with the two shafts disposed in coaxial end-to-end relation within, and projecting out of the housing. Coupling means are provided on the inner end portions of the shafts, within the housing, and two helically coiled springs are arranged within the housing to anchor the output shaft against turning relative to the housing in either direction that an external torque may be applied to the output shaft, while permitting free turning of the output shaft in either direction by the input shaft.

Representative couplings of this general type are shown in U.S. Pat. Nos. 3,393,777, 2,881,881 and 2,946,417, and many others have been designed and patented. Most of these couplings are adequate for their intended purpose of preventing the transmission of torque from the output shaft to the input shaft, but are subject to grabbing and chattering when the output shaft is to be controlled while it is subjected to an aiding or overrunning load.

Moreover, many of these couplings are relatively difficult to assemble with all of the parts in the proper relationship, and often rely, for effective operation, on relatively expensive machined parts that must be manufactured within very close tolerances. Still another problem that has been encountered is buckling of helical springs which are subjected to high compression loads when locked, as explained in U.S. Pat. No. 3,393,777 which proposes the use of a special helical member for preventing such buckling.

SUMMARY OF THE INVENTION

The present invention resides in an improved coupling of the foregoing general character which is effective as a bidirectional no-back coupling and which continues to work smoothly, without grabbing or chattering, when the output shaft is subjected to an aiding load. Moreover, the coupling may be made with simple and inexpensive wire springs arranged to sustain the locking loads in tension rather than in compression so as to avoid the danger of buckling, is easy to assemble and disassemble, and can be manufactured as a high-performance unit at a reasonable cost.

More specifically, the housing of the improved coupling has a pair of outwardly facing locking surfaces around which the helical springs are wrapped with an interference fit so as to be normally coupled to the housing, and each spring is connected at one end to the output shaft so that rotation of this shaft in either direction tends to wind up and contract one of the springs around the associated locking surface. To release both springs in response to driving rotation of the input shaft, means are provided for engaging the free end of the spring tending to contract, and to move this end in a direction to open and release the spring. The other spring is opened as an incident to the beginning of rotation of the output shaft and the accompanying rotation of the fixed end of this spring.

In the preferred embodiment shown herein, the unlocking means comprise a tubular cage disposed around the adjacent end portions of the shafts and connected to the input shaft for rotation therewith, with release elements in the form of rings fitted in the opposite ends of the cage and having oppositely facing abutments engageable with the oppositely facing ends of the two springs. One of these abutments is active in each direction of rotation of the input shaft to unlock the spring tending to contract. The shafts have a lost-motion, jaw-type driving connection between their adjacent ends, and the cage preferably is spline-coupled to the jaws on the input shaft and to the release rings in its opposite ends.

When the coupling is idle, the shafts are maintained in a preselected angular position by preloaded spring means which eliminate excessive looseness or play in the coupling and insure that the unlocking cage is returned to a centered, neutral position to permit relocking of the springs upon cessation of driving by the input shaft. From this centered position, equal amounts of input shaft motion are required in both directions before the jaws of the driving connection are engaged, although light loads may be moved by torque transmitted through the preloading spring alone.

Other objects and advantages of the invention will become apparent from the following detailed description, taken in conjunction with the accompanying drawings.

BRIEF DESCRIPTION OF THE DRAWINGS

FIG. 1 is a fragmentary cross-sectional view of a coupling embodying the novel features of the present invention, taken substantially in a vertical plane through the longitudinal axis of the coupling;

FIG. 2 is a cross-sectional view taken substantially along line 2—2 of FIG. 1; and FIG. 3 is a fragmentary top plan view of the coupling with part of the housing thereof broken away and shown in cross-section.

DETAILED DESCRIPTION OF THE PREFERRED EMBODIMENT

As shown in the drawings for purposes of illustration, the invention is embodied in a so-called bidirectional, no-back coupling 10 of the type in which input and output shafts 11 and 12, respectively, are journaled in a tubular housing 13 in coaxial, end-to-end relation and coupled together inside the housing for driving of the output shaft selectively in either direction by the input shaft. Two helically coiled springs 14 and 15 lock the output shaft releasably to the housing against reverse transmission of torque through the coupling, and thus prevent rotation of the output shaft except by the input shaft.

One illustrative use of this type of coupling is in the controlled and variable positioning of a load with an actuator (not shown) for rotating the input shaft 11 in either direction in response to control signals indicative of desired changes in the position of the load. For example, the load might be a flight control surface of a guided missile and the actuator might be an automatic servomechanism with a closed-loop control system. In such an environment, the output shaft 12 normally is held securely in a fixed position to maintain the load in each selected position except when the input shaft 11 is rotated to change the position of the load, such rotation being transmitted through the coupling 10 to the output shaft and thus to the load, which is moved correspondingly until the desired new position is reached.

Then, through the feedback system, the actuator is deactivated to stop rotation of the input shaft 11, whereupon the output shaft 12 again is locked against rotation relative to the housing 13. It is to be understood that the foregoing is only an example of one illustrative use of the coupling 10. A wide variety of other uses may be made, as will be apparent to those skilled in the art.

With specific reference to FIG. 1, it will be seen that the housing 13 is a hollow, open-ended cylinder with the input shaft 11 projecting into its left end and the output shaft 12 projecting into its right end, each shaft having a coaxial extension 11a, 12a constituting the inner end portion of the shaft and secured to the outer end portion by a pin 17. Each of the inner end portions is journaled in the housing in two spaced anti-friction bearings 18 and 19 mounted inside a sleeve 20, 21 which is fitted into the housing in overlying relation with the inner end portion of the respective shaft.

The left-hand sleeve 20 is fastened in the housing 13 by one or more screws 22, and a snap ring 23 holds the bearing 19 against outwardly facing shoulders 24 and 25 on the sleeve and the inner end portion of the shaft. The right-hand sleeve 21 has an outwardly extending annular flange 27 on its outer end which is clamped between a flange 28 on the housing and an end plate 29 bolted at 30 to the housing flange, the end plate having a central opening 31 through which the output shaft 12 extends. Preferably, a coaxial stem 32 on the inner end of the input shaft extension 11a is rotatably received in a bearing cup 32 recessed into the inner end of the output shaft extension 12a to assist in maintaining the shafts coaxial.

While the driving connection between the two shafts 11, 12 may take various forms, herein the connection is of the jaw type and comprises two driving jaws or lugs 34 (see FIG. 2) projecting outwardly from opposite sides of the inner end portion of the input shaft 11, and two driven jaws or lugs 35 projecting outwardly from a flange 37 on the inner end portion of the output shaft in axially overlapping, interfitting relation with the driving jaws. Each jaw 34 has two oppositely facing, radial faces 38 which are angularly spaced from the opposing radial faces 39 of the jaws 35 when the coupling is in the centered, idle condition shown in FIG. 2, but which are engageable with the opposing faces in appropriate directions of rotation of the input shaft. Thus, two pairs of opposing faces are engaged in each direction of input shaft rotation, to form a positive driving connection between the shafts.

In accordance with a primary aspect of the present invention, the springs 14 and 15 are wrapped around two outwardly facing locking surfaces 40 and 41 of the housing 13 with an interference fit, and each is connected at one end to the output shaft 12 so that rotation of this shaft in either direction tends to tighten one of the springs, thus maintaining the output shaft stationary in the absence of rotation of the input shaft 11. Means responsive to input shaft rotation are provided for unlocking the spring which is active in each direction of rotation of the input shaft, thus freeing the output shaft automatically in response to such rotation of the input shaft, and for effectively relocking the active spring upon cessation of input shaft rotation.

In this instance, the locking surfaces 40 and 41 are the outer sides of the two sleeves 20 and 21, both of which have reduced-diameter inner end portions coaxial with, and spaced radially inwardly from, the inside surface 42 of the housing 13. The springs 14 and 15 are formed to an initial or relaxed inside diameter slightly smaller than the outside diameters of the sleeves, and are pressed onto the sleeves in slightly expanded and stressed condition with a tight, interference fit. The springs are identical and of the same "hand" or helical direction, but are reversed end-for-end so that the remote ends 43 and 44 of the springs face angularly in opposite directions, as shown most clearly in FIG. 3.

The adjacent ends of the springs 14 and 15 are secured to the output shaft 12, herein by means of an axially extending tang 45, 47 on each spring projecting into an axially drilled hole in one of the jaws 35 on the output shaft, as shown in FIGS. 2 and 3. These holes receive the tangs with snug fits, and may have radiused end surfaces (not shown) conforming to the bends in the springs to eliminate sharp surfaces where the springs enter the jaws 35.

Any load on the output shaft 12 tending to rotate the latter clockwise, as viewed in FIG. 2, swings the tang 47 on the right downwardly, and this tends to contract and tighten the spring 15, as will be seen in FIG. 3. Conversely, any load on the output shaft 13 tending to rotate the latter counterclockwise in FIG. 2 swings the tang 45 on the left in FIG. 2 downwardly and tends to contract and tighten the spring 14. In each case, the already tight, active spring grips its locking surface 40, 41 tightly to prevent rotation of the output shaft 12.

To unlock one spring 14, 15 in each direction of input shaft rotation, a tubular cage 48 is disposed in the space between the sleeves 20, 21 and the housing 13, in overlying relation with the springs and with the inner end portions of the sleeves, and is connected to the input shaft 11 for rotation therewith. This cage carries two release elements 49 and 50, one adjacent each end of the cage, which are engageable with the remote ends 43 and 44 of the springs during rotation to the input shaft. In one direction of input shaft rotation, the release element 49 engages the end 43 of the spring 14 and moves this end in a direction to unwind and expand this spring, and in the opposite direction of input shaft rotation, the other release element 50 performs the same function on the spring 15.

In this instance, the cage 48 is an internally splined cylinder and is spline-coupled to the input shaft 11 by meshing spline teeth on the radially outer ends of the driving jaws 34, as seen most clearly in FIG. 2. The driven jaws 35 are shorter, and thus terminate short of the splines. The release elements 49 and 50, shown most clearly in FIG. 3, are rings having external spline teeth witch mesh with the splines on the inside of the cage, each having a triangular tab or dog 51, 52 formed along one edge to project axially inwardly across the end 43, 44 of the adjacent spring 14, 15. Thus, one side 53 of each dog forms an abutment movable with the input shaft and engaging the free end of the associated locking spring.

The two release rings 49 and 50 also may be identical, being reversed during assembly so that the abutment sides 53 face angularly in opposite directions. Each ring is made L-shaped in transverse cross-section, as shown in FIG. 1, and is pressed onto an anti-friction bushing 54. These bushings also are L-shaped in cross-section, having cylindrical portions for bearing against the sleeves 20, 21 and positioning flanges for abutting against the ends of the cage 48.

To reduce the mass of the release mechanism, the cage preferably has cut-away portions (not shown), and various parts are composed of lightweight material such as aluminum. This reduces the inertia that must be overcome in starting and stopping the output shaft.

With the foregoing arrangement, any rotary motion of the input shaft 11 produces an immediate and corresponding movement of the cage 48 and the two release rings 49 and 50. Counterclockwise rotation (FIG. 2) of the input shaft shifts the dog 51 downwardly as viewed in FIG. 3, releasing the left-hand spring 14, and reverse rotation of the input shaft shifts the right-hand dog 52 upwardly (FIG. 3) to release the left-hand spring 15.

Thus, in each case, the unlocking mechanism is responsive to the motion of the input shaft 11 to release the spring 14, 15 that otherwise would be active to prevent rotation of the output shaft 12 in that direction. The spring that is inactive in that direction of rotation of the output shaft is released as an incident to the initial driving of the output shaft, by unwinding movement of the tang 45, 47 with the output shaft.

It will be apparent that the spaces between the opposed faces 38 and 39 of the driving and driven jaws 34 and 35 permit relative angular motion, or lost motion, between the two shafts 11 and 12 before the positive driving connection becomes effective. To eliminate objectionable looseness or play in the coupling, and to equalize this lost motion in each direction of input shaft operation, the driving connection has a preloaded spring 55 (FIGS. 1 and 2) which maintains the jaws yieldably in a centered idle condition and resists movement of the jaws in both directions out of this condition with a preselected force constituting a small percentage of the maximum load rating for which the coupling is designed. This spring also serves to return the unlocking cage 48 to the centered or neutral position as soon as driving-rotation of the input shaft ceases, thereby insuring that the output shaft is relocked immediately in the new position.

As shown most clearly in FIG. 2, the centering spring 55 herein comprises a generally U-shaped spring wire that is disposed between the inner ends of the shafts with the two legs of the U trapped between two spaced pins 57 pressed into holes in the flange 37 around the inner end portion of the output shaft, and projecting generally radially outwardly beyond the pins. The free ends of the legs are snugly received in an inwardly opening cavity 58 formed in one of the jaws 34 on the input shaft. The legs curve toward each other inside the pins 57, and then curve around the pins and flare away from each other into the cavity, which has two sidewalls spaced to straddle and engage the legs while the latter are in engagement with the pins. When free, the legs are spread apart a greater distance than the spacing of the pins, so the centering spring is preloaded when it is installed as shown in FIG. 2.

Thus, the centering spring 55 acts upon both the jaw 34 and the pins 57 to resist relative movement of the shafts 11 and 12 out of the centered position, but yields to permit movement of the input shaft in either direction to bring a pair of opposed faces 38, 39 into driving engagement. As rotation of the input shaft is stopped, the centering spring returns the jaws to the centered condition shown in FIG. 2, thereby returning the unlocking cage to the centered position in which neither dog 51, 52 acts to unwind its associated spring 14, 15.

Accordingly, the centering spring 55 normally maintains the cage 48 in the centered position with the jaws 34 and 35 spaced apart as shown in FIG. 2 with the springs 14 and 15 serving as a brake preventing movement of the output shaft 12 in either direction. This spacing permits the initial angular motion of the input shaft 11 to unlock one of the locking springs, after which the initial angular motion of the output shaft with the input shaft unlocks the remaining spring to permit free, driven rotation of the output shaft.

With a very light or aiding load, it will be seen that the driving and driven faces 38, 39 need not be engaged in order to unlock the springs and transmit torque.

As soon as the input shaft begins to turn, one of the springs 14, 15 is unlocked by the cage 48 and the centering spring can transmit sufficient torque between the two shafts to start the output shaft in motion and unlock the second spring. When the input shaft stops, however, the coupling immediately locks up to hold the output shaft in place.

From the foregoing, it will be apparent that the present invention provides an effective bidirectional no-back coupling 10 in which the output shaft 12 is released and locked smoothly, even when subjected to a substantial aiding load. Since the springs act in tension rather than in compression, there is no danger of buckling of the spring under high loads, and simple and inexpensive wire springs may be used. Moreover, the design of the coupling is such that there are no close tolerance requirements, and the entire assembly is easy to assemble and disassemble and is capable of being manufactured at relatively low cost.

It also will be apparent that, while a particular form of the invention has been illustrated and described, various modifications can be made without departing from the spirit and scope of the invention.

I claim:

1. A bidirectional no-back coupling having, in combination:
   a fixed housing;
   input and output shafts journaled in said housing in end-to-end relation;
   means for coupling the adjacent ends of said shafts together for rotation of said output shaft by said input shaft, and permitting limited relative angular movement of said shafts;
   a pair of sleeves telescoped over the adjacent end portions of said shafts inside, and secured to, said housing;

a pair of helical springs wrapped around the radially outer sides of said sleeves with an interference fit and each having an inner end secured to said output shaft, said springs being of the same hand whereby the outer ends face in opposite angular directions and one of said springs normally locks said output shaft to said housing to prevent rotation thereof in response to torques applied to said output shaft;

an elongated tubular unlocking member telescoped over said sleeves and said springs and having opposite end portions overlying the respective springs inside said housing, said unlocking member being coupled to said input shaft for rotation therewith;

a release element adjacent each end of said unlocking member and rotatable therewith, and thus with said input shaft, said release elements having oppositely facing abutments for engaging the outer ends of said spring and thereby uncoupling one of said springs from said housing in each direction of rotation of said input shaft while the other spring is uncoupled from said housing by rotation of the inner end thereof with said output shaft as the latter is turned by said coupling means;

and spring means independent of said helical springs acting between said shafts to urge the latter yieldably into a preselected angular relation within the range of said limited angular movement, thereby to return said release element to a preselected neutral position and relock said output shaft upon cessation of rotation of said input shaft.

2. A bidirectional no-back coupling as defined in claim 1 in which said coupling means comprise sets of interfitting jaws on the inner end portions of said shafts, said jaws having pairs of normally spaced driving faces engageable to form a lost motion, positive driving connection between said shafts.

3. A bidirectional no-back coupling as defined in claim 2 in which said spring means comprises a preloaded spring acting between said sets of jaws and normally maintaining said shafts in a preselected angular relation for a preselected and equal angular increment of movement in each direction before said driving faces are engaged.

4. A bidirectional no-back coupling as defined in claim 2 in which said unlocking member is a lightweight cylindrical cage telescoped over said springs and connected to said input shaft for rotation therewith about said springs.

5. A bidirectional no-back coupling as defined in claim 4 in which the jaws on said input shaft project radially outwardly to said cage and are spline-coupled thereto, the jaws of said output shaft being rotatable relative to said cage.

6. A bidirectional no-back coupling as defined in claim 1 in which said unlocking member is a cylindrical cage telescoped over said shafts and overlying said springs, and said release elements are mounted in the opposite ends of said cage with said abutments engaging said outer spring ends.

7. A bidirectional no-back coupling as defined in claim 6 in which said release elements are rings that are spline-coupled to the inside of said cage.

8. A bidirectional no-back coupling as defined in claim 7 in which said coupling means include radially projecting jaws on said input shaft, said jaws also being spline-coupled to the inside of said cage to rotate the latter with said input shaft.

9. A bidirectional no-back coupling as defined in claim 7 in which said rings have dogs thereon formed with the abutments for engaging said outer spring ends.

10. A bidirectional no-back coupling having, in combination:

a housing having a pair of end-to-end tubular elements formed with outwardly facing locking surfaces;

end-to-end input and output shafts each having an inner end portion disposed in said housing and telescoped within one of said tubular elements;

means forming a lost-motion positive driving connection for coupling said input shaft to said output shaft to drive the latter;

a pair of helical springs wrapped around said tubular elements and normally gripping said locking surfaces, each of said springs having one end portion secured to said output shaft to tighten one of the springs around one of the locking surfaces in each direction of rotation of the output shaft while loosening the other spring;

the other ends of said springs facing angularly in opposite directions around said locking surfaces;

and unlocking means connected to said input shaft for rotation therewith, said unlocking means including two release elements carried by an elongated tubular member disposed around both of said springs and positioning said release elements for engagement with said oppositely facing ends and operable in each direction of rotation of the input shaft to loosen the spring that otherwise would be tightened by rotation of said output shaft in that direction, whereby said output shaft is released from both of said locking surfaces upon rotation of said input shaft in either direction.

11. A bidirectional no-back coupling as defined in claim 10 further including spring means in addition to said helical springs yieldably urging said shafts to a preselected angular relation and operable upon cessation of rotation of said input shaft to move the latter and said unlocking means to a neutral position in which both of said springs are locked to said locking surfaces.

12. A bidirectional no-back coupling as defined in claim 10 in which said tubular member is a cylindrical cage overlying both of said springs and carrying abutments engageable with said other spring ends.

13. A bidirectional no-back coupling having, in combination:

a fixed housing;

input and output shafts journaled in said housing in end-to-end relation;

means for coupling the adjacent ends of said shafts together for rotation of said output shaft by said input shaft, and permitting limited relative angular movements of said shafts, said coupling means comprising sets of interfitting jaws on the inner end portions of said shafts, said jaws having pairs of normally spaced driving faces engageable to form a lost motion, positive driving connection between said shafts;

a pair of sleeves telescoped with the adjacent end portions of said shafts inside, and secured to, said housing;

a pair of helical springs wrapped around said sleeves with an interference fit and each having an inner end secured to said output shaft, said springs being of the same hand whereby the outer ends face in opposite angular directions and one of said springs normally locks said output shaft to said housing to prevent rotation thereof in response to torques applied to said output shaft;

an unlocking member having opposite end portions overlying the respective springs inside said housing and coupled to said input shaft for rotation therewith;

a release element adjacent each end of said unlocking member and rotatable therewith, and thus with said input shaft, said release elements having oppositely facing abutments for engaging the outer ends of said springs and thereby uncoupling one of said springs from said housing in each direction of rotation of said input shaft while the other spring is uncoupled from said housing by rotation of the inner end thereof with said output shaft as the latter is turned by said coupling means;

and means acting between said shafts to urge the latter yieldably into a preselected angular relation, thereby to return said release element to a neutral position and relock said output shaft upon cessation of rotation of said input shaft, said shaft-urging means comprising a generally U-shaped spring adjacent the inner ends of said shafts and having spring legs projecting radially outwardly on one side thereof, and two pairs of spaced abutments on said shafts abutting against opposite sides of said spring legs and preloading the latter to hold the shafts in said preselected angular relation.

14. A bidirectional no-back coupling having, in combination:

a housing;

input and output shafts projecting into said housing from opposite sides thereof and having inner end portions disposed in end-to-end relation within the housing;

a lost-motion drive coupling on said inner end portions comprising two sets of interfitting jaws having normally spaced driving faces engageable after a preselected amount of angular motion of said shafts;

two outwardly facing cylindrical locking surfaces within said housing and around said inner end portions of said shafts;

two helical springs, one wrapped around each of said locking surfaces with an interference fit, said springs having ends facing angularly in opposite directions and each having one free end and a second end secured to said output shaft for tightening of one spring around the associated locking surface in each direction in with torque is applied to said output shaft;

an elongated cylindrical cage telescoped over said springs within said housing and coupled to said input shaft for rotation therewith, said cage having internal release abutments therein facing angularly in opposite directions and engaging the free ends of said springs to uncouple one of the springs from the associated locking surface in each direction of rotation of said cage with said input shaft;

and a preloaded centering spring mounted in said drive coupling and acting between said sets of jaws to urge the latter to a preselected angular relation in which substantially equal increments of angular motion in each direction are required before said driving faces become engaged.

15. A bidirectional no-back coupling as defined in claim 14 in which said cage is internally splined, and said jaws on said input shaft have mating splines which couple said cage to said input shaft.

16. A bidirectional no-back coupling as defined in claim 15 in which said release abutments are formed on rings fitted into said cage and externally splined to mate with the splines in said cage.

17. A bidirectional no-back coupling as defined in claim 14 in which said centering spring is generally U-shaped, and has spring legs projecting radially outwardly within said drive coupling, said shafts carrying two pairs of opposed abutments abutting against opposite sides of said spring legs and preloading the latter.

* * * * *